United States Patent
Pottebaum et al.

(10) Patent No.: US 6,721,134 B1
(45) Date of Patent: Apr. 13, 2004

(54) RAMP DESIGN FOR DYNAMIC LOAD

(76) Inventors: Kenneth L. Pottebaum, 321 Redbud St., Yukon, OK (US) 73099; Markus E. Mangold, 8297 Stock Bridge Cir., Eden Prarie, MN (US) 55344; Curtis A. Trammell, 704 S. Hwy. 76, Newcastle, OK (US) 73065

( * ) Notice: Subject to any disclaimer, the term of this patent is extended or adjusted under 35 U.S.C. 154(b) by 0 days.

(21) Appl. No.: 09/553,074

(22) Filed: Apr. 20, 2000

Related U.S. Application Data (60) Provisional application No. 60/130,277, filed on Apr. 21, 1999.

(51) Int. Cl.$^7$ ............................................. G11B 21/22
(52) U.S. Cl. ................................................ 360/254.8
(58) Field of Search ...................... 360/254.8, 254.7, 360/254.2, 254, 250, 255, 254.3, 254.4

(56) References Cited

U.S. PATENT DOCUMENTS

| | | | |
|---|---|---|---|
| 4,933,785 A | | 6/1990 | Morehouse et al. ..... 360/78.04 |
| 5,027,241 A | * | 6/1991 | Hatch et al. ................. 360/255 |
| 5,034,837 A | | 7/1991 | Schmitz ....................... 360/105 |
| 5,214,550 A | | 5/1993 | Chan ......................... 360/97.01 |
| 5,235,482 A | | 8/1993 | Schmitz .................... 360/97.02 |
| 5,237,472 A | * | 8/1993 | Morehouse et al. ........ 360/105 |
| 5,455,723 A | | 10/1995 | Boutaghou et al. ........... 360/75 |
| 5,615,064 A | * | 3/1997 | Blank et al. .................... 360/75 |
| 5,623,758 A | | 4/1997 | Brooks, Jr. et al. ...... 29/603.01 |
| 5,831,790 A | | 11/1998 | Iftikar et al. ............. 360/99.12 |
| 5,831,795 A | | 11/1998 | Ma et al. .................... 360/105 |
| 5,864,448 A | * | 1/1999 | Berberich .................... 360/105 |
| 5,875,072 A | | 2/1999 | Brooks, Jr. et al. ......... 360/104 |
| 5,875,074 A | * | 2/1999 | Ho et al. .................. 360/254.9 |
| 5,991,122 A | * | 11/1999 | Tangren et al. .......... 360/244.2 |
| 5,995,330 A | * | 11/1999 | Furay et al. ................. 360/105 |
| 6,078,474 A | * | 6/2000 | Koyanagi et al. ......... 360/254.8 |
| 6,181,529 B1 | * | 1/2001 | Aoyagi et al. .............. 360/255 |
| 6,246,536 B1 | * | 6/2001 | Galloway ..................... 360/61 |
| 6,259,671 B1 | * | 7/2001 | Shibusaka ................... 369/247 |
| 6,301,081 B1 | * | 10/2001 | Fahey ......................... 360/255 |
| 6,307,716 B1 | * | 10/2001 | Hamaguchi et al. ...... 360/254.4 |

* cited by examiner

*Primary Examiner*—A. J. Heinz
*Assistant Examiner*—Angel Castro
(74) *Attorney, Agent, or Firm*—Jennifer M. Buenzow (57) ABSTRACT

A magnetic disc drive includes a base, a disc rotatably attached to said base, and a ramp attached to the base near said disc. The magnetic disc drive also has an actuator assembly pivotably attached to the base. The actuator assembly rotates about an actuator pivot point. The actuator assembly further includes a suspension attached to one end of the actuator assembly, and a transducer attached to the suspension. The actuator assembly moves the transducer between a transducing position and an unload position. The suspension includes a lift tab which contacts the ramp at a contact point as the transducer is moved to the unload position. As the actuator assembly moves the transducer to the unload position, the contact point moves toward the actuator pivot point. This results in a change of the resonant frequency of the actuator assembly. The resonant frequency is lower when the transducer is near the end of the ramp proximate the disc. The ramp can have a straight or a curved lift tab contact path.

19 Claims, 9 Drawing Sheets

RAMP DESIGN FOR DYNAMIC LOAD

RELATED APPLICATION

This application claims the benefit of U.S. Provisional Application Ser. No. 60/130,277, filed Apr. 21, 1999 under 35 USC 119(e).

FIELD OF THE INVENTION

The present invention relates to the field of mass storage devices. More particularly, this invention relates to a disc drive which includes a ramp for loading and unloading read/write heads from the surface of a disc in the disc drive.

BACKGROUND OF THE INVENTION

One of the key components of any computer system is a place to store data. Computer systems have many different places where data can be stored. One common place for storing massive amounts of data in a computer system is on a disc drive. The most basic parts of a disc drive are a disc that is rotated, an actuator that moves a transducer to various locations over the disc from track to track, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically housed within a small ceramic block. The small ceramic block is passed over the disc so that it can read information representing data from the disc or write information representing data to the disc. When the disc is operating, the disc is usually spinning at relatively high revolutions per minute ("RPM"). These days common rotational speeds are 7200 RPM. Rotational speeds in high performance disc drives are as high as 10,000 RPM. Higher rotational speeds are contemplated for the future. These high rotational speeds place the small ceramic block in high air speeds.

The small ceramic block, also referred to as a slider, is usually aerodynamically designed so that it flies over the disc. The bottom side of the slider, the area that is facing the disc surface, is aerodynamically designed so that the distance variation (fly height variation) of the head to the disc is minimal. Fly height variations occur, because of different shew angles between the air flow and the slider leading edge and different air speeds, while the slider is positioned on different tracks on the disc. The slider has an air bearing surface ("ABS") which includes rails and a cavity between the rails. The air bearing surface is that portion of the slider that is nearest the disc as the disc drive is operating. When the disc rotates, an air bearing is formed between the disc and head. This air bearing lifts the head off of the disc and reduces friction forces. Some head designs have a depression in the air bearing surface that produces a negative pressure area at the depression. The negative pressure or suction counteracts the pressure produced at the rails to provide more uniform fly heights from disc inner diameter (ID) to outer diameter (OD). The fly height is the thickness of the air lubrication film or the distance between the disc surface and the head. This film eliminates mechanical friction and resulting wear that would occur if the slider and disc were in mechanical contact during disc rotation.

The best performance of the disc drive results when the head is flown as closely to the surface of the disc as possible without contact between the disc and the slider. Today's slider is designed to fly on a very thin layer of gas or air. In operation, the distance between the head and the disc is very small. Currently "fly" heights are about 1–2 microinches. It is contemplated that in future disc drives, the slider will not fly on a cushion of air but rather will pass through a layer of lubricant on the disc. A flexure or gimbal is attached to the load spring or load beam and to the slider. The flexure allows the slider to pitch and roll so that the slider can remain in close proximity to the disc.

Information representative of data is stored on the surface of the memory disc. Disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved in a substantially radial direction across the tracks to a selected target track. To be totally accurate, the slider passes in a circular motion as it pivots about the axis of the actuator assembly. The data is divided or grouped together on the tracks. In most disc drives, the tracks are a multiplicity of concentric circular tracks. Servo feedback information is used to accurately locate the transducer.

One of the most critical times during the operation of a disc drive occurs just before the disc drive shuts down or during the initial moment when the disc drive starts. When shutdown occurs, the slider fly height decreases until the slider contacts the disc. The small block or slider is moved to a non-data area of the disc where it literally landed and skidded to a stop. To improve magnetic performance, discs now are formed with a smooth surface. The smooth surface allows lower flying heights. Stiction, which is static friction, occurs between the air bearing surface of the slider and the smooth disc surface. Forces from stiction, in some instances, can be high enough to separate the slider from the suspension or prevent the disc from spinning.

To overcome the stiction problem and to provide for a much more rugged design for disc drives used in mobile computers, such as portable computers and notebook computers, disc drive designers began unloading the sliders onto a ramp positioned on the edge of the disc. Disc drives with ramps are well known in the art. U.S. Pat. No. 4,933,785 issued to Morehouse et al. is one such design. Other disc drive designs having ramps therein are shown in U.S. Pat. Nos. 5,455,723, 5,235,482 and 5,034,837. Before power is actually shut off, the actuator assembly moves the suspension, slider and transducer to a park position on the ramp. Commonly, this procedure is referred to as unloading the heads. The disc drive must also be able to unload the heads if a so-called hot unplug occurs, where the slider is moving at full speed towards inner diameter ("ID") and has almost reached the ID. The rotary inertia of the disc stack is now used to spin the motor, which is used as a generator to move the head stack from the ID to the outer diameter ("OD") and up the ramp. Unloading the heads helps to insure that data on the disc is preserved since, it prevents shock inputs from causing heads to lift off of the disc and slap back down onto the disc. Unloading the heads can also prevent disc-to-arm contact that can cause disc damage. When starting up the disc drive, the process is reversed. In other words, the suspension and slider are moved from the ramp onto the surface of the disc which is already spinning at a constant speed. This is referred to as loading the heads or sliders onto the disc.

Use of a ramp to load and unload the disc overcomes many aspects of the stiction problem. However, during the loading process and the unloading process, the slider can contact the disc and result in head or disc damage. The danger of contact between the slider and discs is fairly high.

Dynamic load/unload of the slider to and from the disc is a very critical process, because of the potential danger of contact between the disc and the slider air-bearing surface. Since the air-bearing suction exerts a force that will hold the slider on the disc during the unloading process, deformation energy is stored in the lift tab and gimbal as the lift tab moves up the ramp. When the ramp induces sufficient lift force on the head, the head will release from the disc. This release of the head from the disc dissipates the air bearing and allows the energy stored in the lift tab and gimbal to be released. This stored potential energy is converted into kinetic energy similar to the conversion that occurs when a spring is pulled and then released. The head suspension system will oscillate in a manner similar to the simple spring mass system. The period of this vibration depends on the system's stiffness and natural frequency when the lift tab is on the ramp. A lower natural frequency will increase the time before the slider bounces back which gives more time to move the head clear of the disc and therefore allow slower unload velocities. However, low natural frequency systems have low lift tab stiffnesses and low stiffnesses mean increased lift tab deflections that result in an increased unload footprint or increased distance required to unload the head. A stiff system would have a small unload footprint but will also have a higher natural frequency. A stiff lift tab with its higher frequencies, will cause the slider to bound back more quickly. The lower natural frequency is desirable but with a stiff lift tab.

What is needed is a disc drive having a structure that allows for use of a stiff lift tab but which has a lower resonant frequency so that the initially lifting off of the slider can take place over a longer amount of time. Also needed is a disc drive in which the time required to move the lift tab up a selected distance on the ramp is less than one cycle of the natural resonant frequency of the actuator assembly. This will prevent the slider from rebounding and slapping the disc. What is also needed is a method for loading the sliders onto the disc without causing damage to the heads and discs. Also needed is a method for avoiding contact between the disc and the slider so that the damage resulting from a contact will be minimal or even eliminated. The system should be robust and easy to manufacture.

SUMMARY OF THE INVENTION

A magnetic disc drive includes a base, a rotating disc attached to the base, and a ramp attached to the base near said disc. The magnetic disc drive also has an actuator assembly attached to the base. The actuator assembly rotates about an actuator pivot point. The actuator assembly further includes a suspension attached to one end of the actuator assembly, and a transducer attached to the suspension. The actuator assembly moves the transducer between data tracks on the disc and an unload position. The suspension includes a lift tab which contacts the ramp at a contact point as the transducer is moved to the unload position. As the actuator assembly moves the transducer to the unload position, the contact point between the lift tab and the ramp moves toward the actuator pivot point. The lift tab contact point movement towards the pivot is caused by the ramp edge angling towards the actuator pivot point. The lift tab contact point on the ramp moves towards the actuator pivot point as the lift tab moves up the ramp. The lift tab contact point on the ramp may follow a straight or contoured path. As the lift tab contact point moves closer to the actuator pivot point, its reduction in its effective length causes its natural frequency to increase.

The natural resonant frequency of the actuator assembly when the lift tab contacts the ramp near the disc may be selected to optimize any of the following conditions: 1) its natural frequency with regard to disc RVA components, 2) head bound back period, and 3) increased compliance to accommodate effects of tolerances. The lift tab contact point changes as the heads move out of the flyable zone of the disc. The lift tab contact point is selected to increase the lift tab stiffness to ensure that all of the heads are off of the discs when assembly tolerances are considered. While flying over the disc, the initial cycle time of the actuator arm may be selected to be a longer time, but since the resonance frequency increases as the lift tab moves along the ramp, the cycle time of the actuator arm effectively decreases.

Also disclosed is an information handling system which includes a base, a disc rotatably attached to the base, a ramp attached to the base near the disc, and an actuator assembly pivotably attached to the base. The actuator assembly pivots about an actuator pivot point. The actuator further includes a suspension attached to one end of the actuator assembly, and a slider carrying the read/write element attached to the suspension. The dimple is part of the load beam. It is either formed or partially etched. The dimple is a pivot point about which the slider attached to the flexure or gimbal pivots. The gimbal is a usually very compliant sheet metal structure that is welded to the load beam. The slider is then glued to the flexure or gimbal. The actuator assembly moves the slider between a transducing position and an unload position. The suspension includes a lift tab which contacts the ramp at a contact point as the transducer is moved to an unload position. The ramp is designed so that the distance between the contact point and the actuator pivot point shortens as the actuator assembly moves the transducer up the ramp. The actuator assembly resonant frequency increases as the distance between the contact point and the actuator pivot point shortens. The lift tab contact edge may be substantially straight and positioned on a radial or non-radial chord of the disc or may be substantially curved. The ramp further comprises a lift tab contact edge where the lift tab contacts the ramp. The lift tab contact point moves toward the actuator pivot point as the actuator assembly moves the transducer up the ramp toward the unloaded position.

Also disclosed is a disc drive which includes a disc, an actuator assembly, a transducer attached to the actuator assembly, and a device for moving the transducer between a data track with respect to the disc and an unloaded position.

Advantageously, the invention allows for use of a stiff lift tab that has a lower resonant frequency at the bottom of the ramp so that the initial lift off of the slider can take place over a longer time. The resonant frequency increases as the lift tab moves further up the ramp which results in minimization of the footprint during unloading. The length between the contact point on the slider and the pivot point of the actuator shortens as the lift tab moves up the ramp. Initially, the time required to move the lift tab up a selected distance on the ramp is less than one cycle of the natural resonant frequency of the actuator assembly. This method for unloading the sliders from the disc prevents or minimizes the possibility of contact as well as the possibility of damage to the heads. The ramp features required for this design are easy to manufacture and the ramp does not require adjustment.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
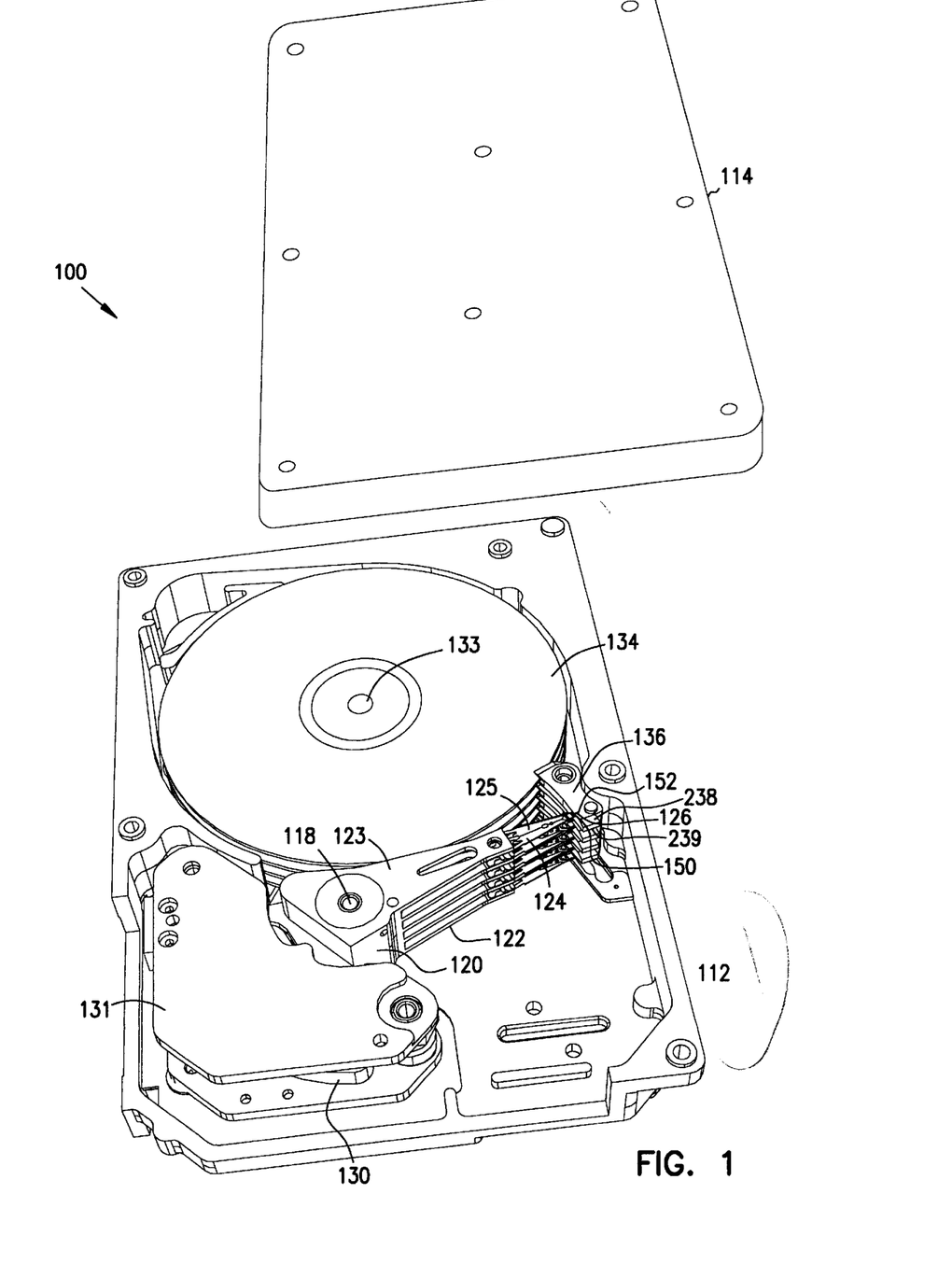
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb like structure 122 having a plurality of arms 123. Attached to the separate arms 123 on the comb 122, are suspensions 125. A suspension comprises a load beam and a gimbal or flexure. Attached at the end of each suspension 125 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. Also attached to the load spring is a lift tab 152. The lift tab 152 is used for loading sliders 126 to the disc 134 and unloading the sliders 126 from the disc. On the end of the actuator arm assembly 120 opposite the load springs 124 and the sliders 126 is a voice coil (not shown).

Attached within the base 112 is at least one magnets 130. A metal structure 131 directs lines of magnetic flux from the magnet 130 to areas around a voice coil (not shown) attached to the actuator assembly 120. Some designs may only contain a single magnet. The pair of magnets 130 and the structure 131, and the voice coil (not shown) are the key components of a voice coil motor which applies a force to the actuator assembly 120 to rotate it about the actuator shaft 118. Also mounted to the base 112 is a spindle motor (not shown). The spindle motor (not shown) includes a rotating portion called the spindle hub 133. In this particular disc drive, 'the spindle motor (not shown) is within the hub. In FIG. 1, a number of discs 134 are attached to the spindle hub 133. In other disc drives a single disc or a different number of discs may be attached to the hub 133. The invention described herein is equally applicable to such other disc drives.

Figure 2:
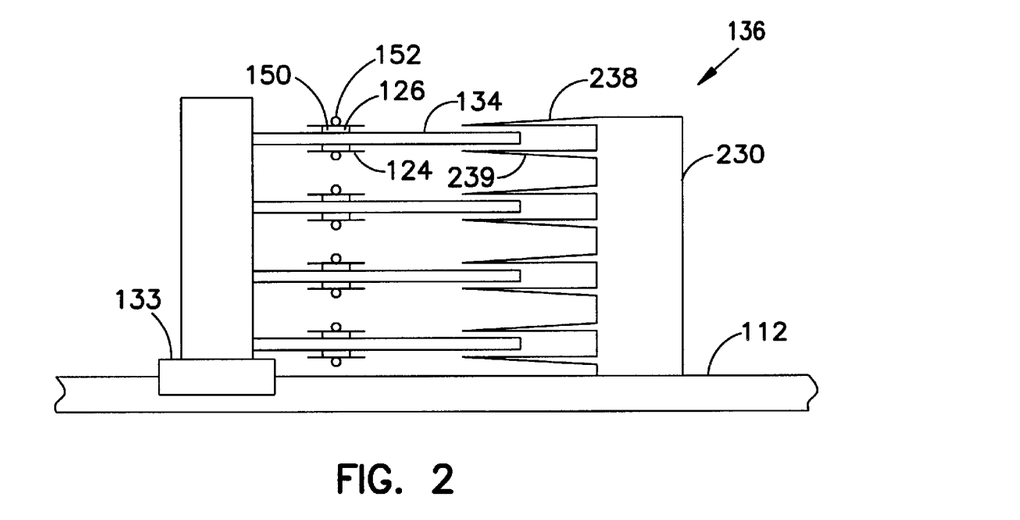
FIG. 2 is a side view of a disc drive having a ramp structure.

Also attached to the base 112 is a ramp structure 136. FIG. 2 is a side view of a disc drive having a ramp structure 136. Now looking at FIG. 2, the ramp structure will be described in more detail. The ramp structure 136 has a plurality of individual ramps 238 and 239. One ramp is associated with each surface of the disc. As shown, there is a ramp portion 238 for the top surface of a disc and a ramp 239 for a bottom surface of the disc 134. The ramp portion 238 is for the loading and unloading the transducer from the top surface of a disc 134 and the ramp portion 239 is for loading and unloading a transducer from the bottom surface of a disc 134. Ramp structure designs may allow the ramp structures to be jointed for added strength where it will not interfere with the lift tab or disc. The disc drive shown in FIG. 2 has four discs. Each disc 134 has two surfaces so there are a total of eight disc surfaces within the disc drive shown. Only one disc and set of ramps 238 and 239 are labeled. The other discs and ramps are similar to the labeled disc 134 and set of ramps 238 and 239. The ramp structure 136 shown in FIG. 2 is fixed to the base of the disc drive. The ramp structure can be formed as one unitary part or can be assembled from a number of different parts. For example, the ramp structure 136 shown could be comprised of three parts. Each part would include a set of ramps 238 and 239 and a main body 230 to which the ramps 238 and 239 are attached. A portion of each of the ramp portions 238 and 239 of the ramp is positioned over the disc 134. It should be noted that this invention could also be used on ramps that rotate in and out of a load/unload position.

Figure 3:
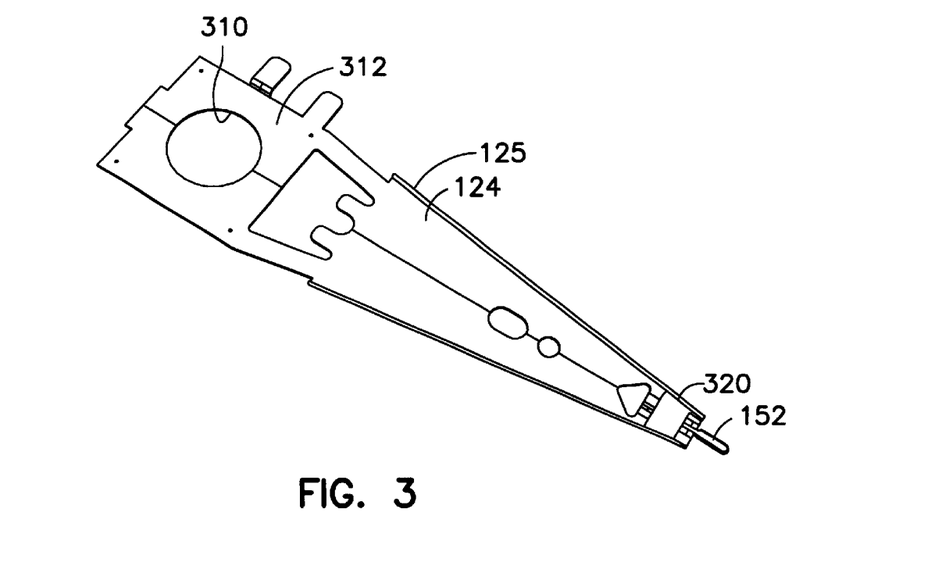
FIG. 3 is a perspective view of a load beam and lift tab.

Turning briefly to FIG. 3, the suspensions 125, include lift tabs 152 attached to the load spring 124. The lift tabs 152 are attached to the load springs 124. The slider 126 is shown in FIG. 2; however, for the sake of clarity the transducer is not illustrated. All the load springs 124 and lift tabs 152 are attached to the actuator (see FIG. 1). Now referring to both FIGS. 1 and 2, moving the actuator assembly 120 moves all the suspension 125, lift tabs 152, and sliders 126. However, this design is also applicable to systems that move each head individually, in pairs, or other groups. In operation, the actuator assembly 120 is moved to a park position when the disc drive is powered down. Moving the actuator to the park position causes the lift tabs 152 associated with each load spring 124 to ride up the ramp 238 or 239 associated with the surface of the disc 134. This is referred to as unloading the slider. When the disc drive is powered on, the actuator moves to an operating position by moving the lift tabs 152 off their respective ramps 238 or 239 placing the sliders 126 and transducers 150 into a flying position over the surface of the disc 134. This is referred to as loading the slider. The load springs 124, lift tabs 152, sliders 126 and transducers 150 of the disc drive are shown in a transducing position or fly position in FIG. 2. It should be noted that much of the actuator assembly 120 has been eliminated from FIG. 2 for the sake of clarity.

FIG. 3 is a perspective view of a suspension 125 with lift tab 152. The load spring 124 is a triangular or trapezoidal structure which acts as a cantilevered spring to place a small load onto the slider 126 when the slider 126 is flying over the disc 134. The load spring 124 is attached at its attachment end to an actuator arm 123 (shown in FIG. 1). The load spring 124 shown in FIG. 3 has a swage opening 310 and a base or swage plate 312 in the attachment end. The swage opening 310 and base or swage plate 312 are used to attach the load spring 124 by a process referred to as swaging. Other attachment methods may also be used without departing from the spirit of this invention. The lift tab 152 is attached to a free end 320 of the load spring 124. The lift tab 152, also known as a tang, is shown as an elongated cylinder. Other shapes can also be used for the lift tab 152.

Figure 4:
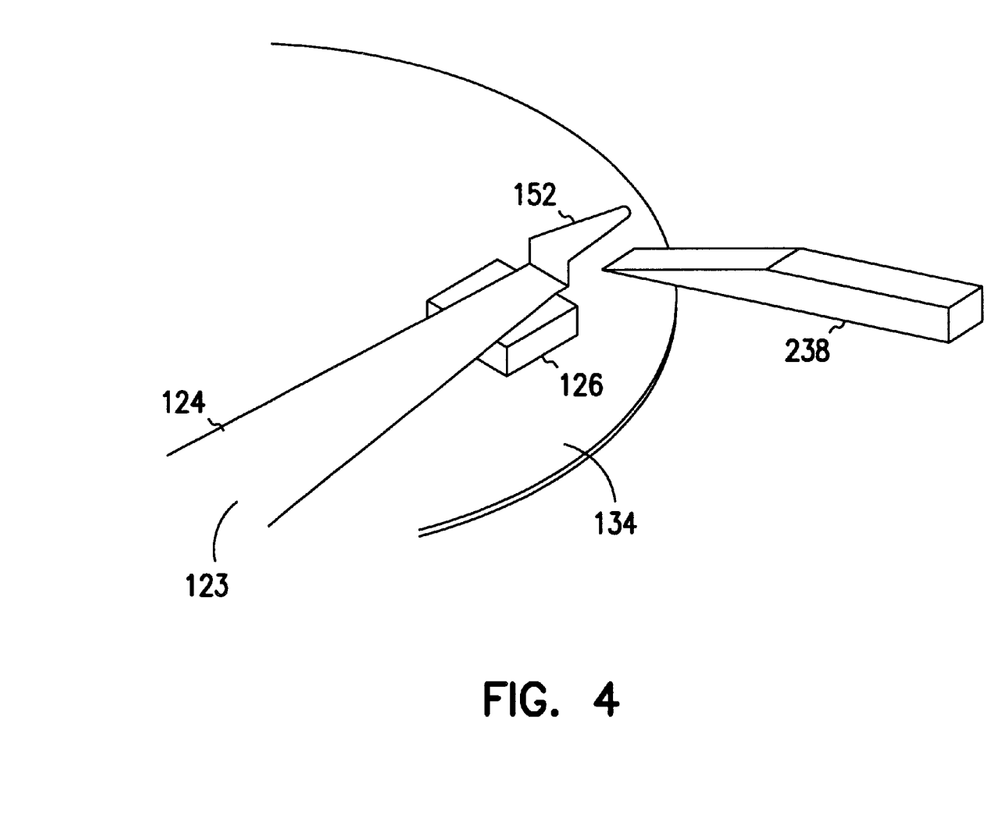
FIG. 4 is a perspective view of a slider on the tip of the ramp structure.

FIG. 4 is a perspective view of the slider 126 at the tip of the ramp 238. This is the position of the slider 126 either just before loading of the slider 126 from the ramp 238 onto the disc, or just after unloading of the slider 126 from the disc 134. During unloading, the slider 126 is removed from the surface of the disc 134 and the lift tab 152 is parked on the ramp 238.

Figure 5:
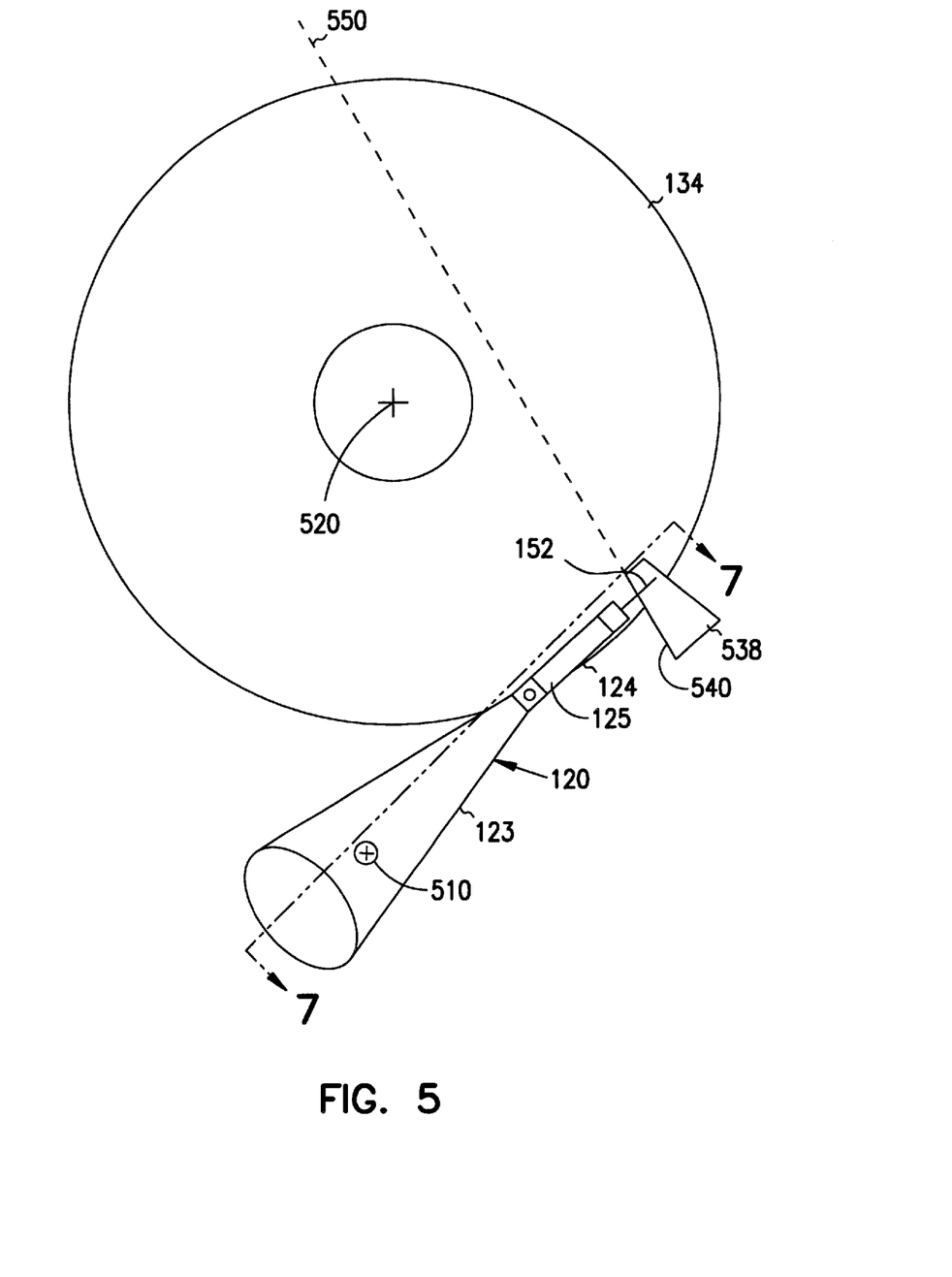
FIG. 5 is a top view of the actuator arm and ramp showing the actuator arm in a first position with respect to the ramp where the lift tab is initially engaging the ramp in an unload operation.

FIG. 5 is a top view of the actuator arm 123 and a ramp 538 having an alternate ramp shape than shown previously. This particular view shows the actuator arm 120 in a first position with respect to the ramp 538. The actuator assembly 120 includes the actuator arm 123 which pivots about an actuator pivot point 510. Attached to the actuator arm 123 is the suspension 125. Part of the suspension 125 is the lift tab 152. In this particular top view, the slider and transducer have been removed for the sake of clarity. Also shown in this view is the disc 134 which rotates counter clockwise about a disc pivot point 520. The disc pivot point 520 corresponds to the rotational center of the spindle or hub (shown in FIG. 1). As can be seen, the ramp 538 is shaped so that it has an edge 540. The edge 540 is colinear with a chord 550 of the disc 134. As the actuator 120 rotates about the pivot point 510 with the read/write heads (shown in FIG. 1), it can be seen that the load or contact point on the lift tab 152 moves closer to the pivot point 510 as the actuator assembly 120 pivots to an unloaded position or moves the lift tab 152 up the ramp. The edge 540 is also known as the contact edge of the ramp 538. Thus, as the actuator assembly 120 moves from a position over the disc 134 to the unloaded position, the contact point between the lift tab 152 and the edge 540 moves toward the actuator pivot point 510.

Figure 6:
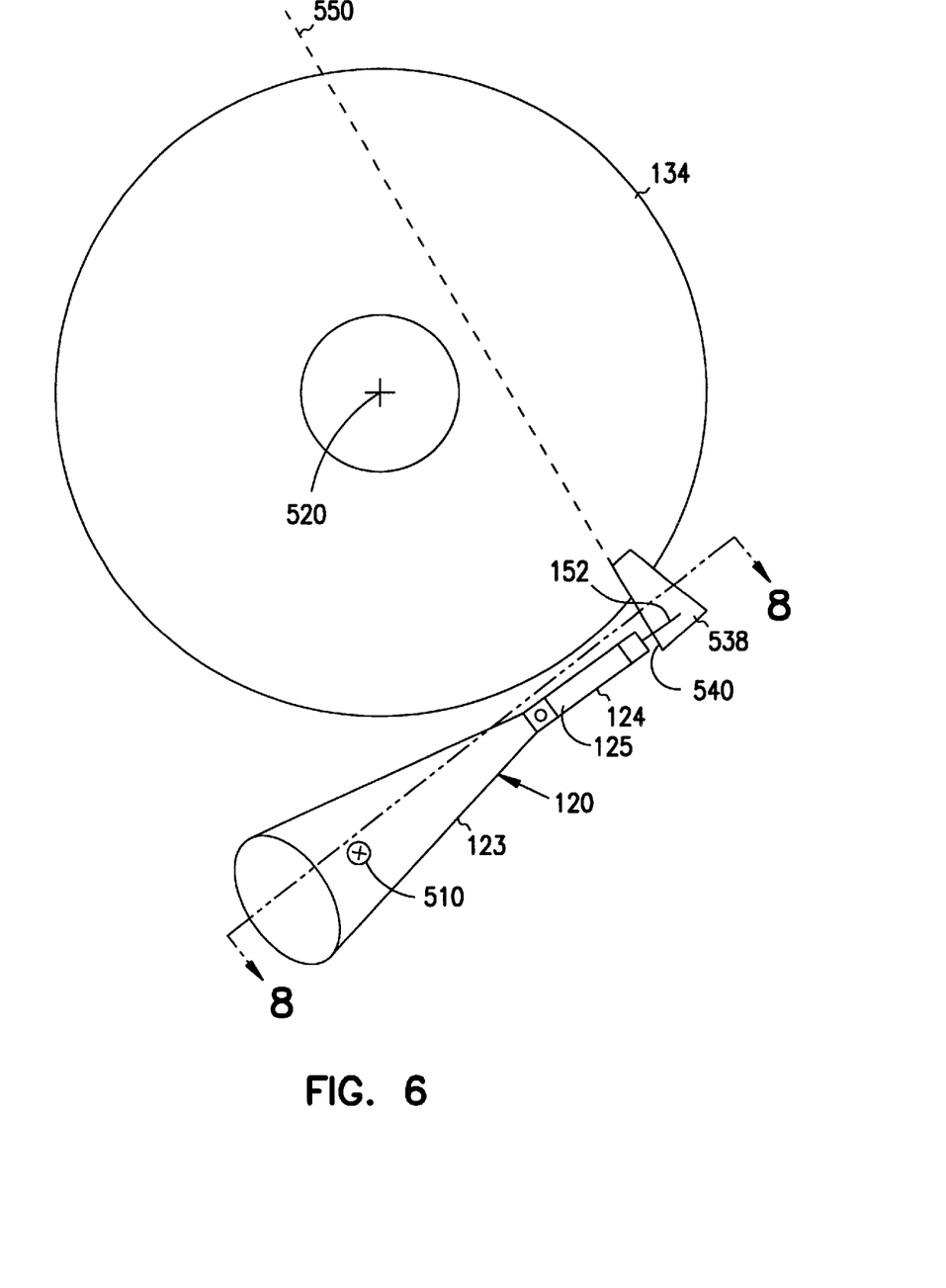
FIG. 6 is a top view of the actuator arm and ramp showing the actuator arm in a second position with respect to the ramp where the lift tab has been moved farther up the ramp.

This can be more clearly seen in FIG. 6. FIG. 6 is a top view of the actuator arm showing the actuator arm assembly 120 in a second position with respect to the ramp 538. In FIG. 6, the actuator assembly has moved from the position shown in FIG. 5 to an unloaded position shown in FIG. 6. In the unloaded position, the actuator assembly 120 and specifically the lift tab 152 are parked away from the disc 134. As can be seen from this top view, although the length of the part does not change, the contact point on the lift tab 152 does change. The contact point moves toward the end of the suspension as the lift tab 152 moves along the edge 540 of the ramp 538 further away from the center of the disc 520.

Figure 7:
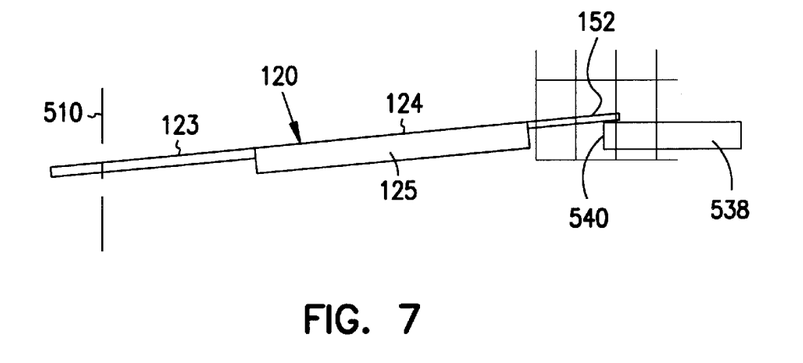
FIG. 7 a side view of the actuator arm and ramp along line 7—7 in FIG. 5 showing the actuator arm in a first position with respect to the ramp.
Figure 8:
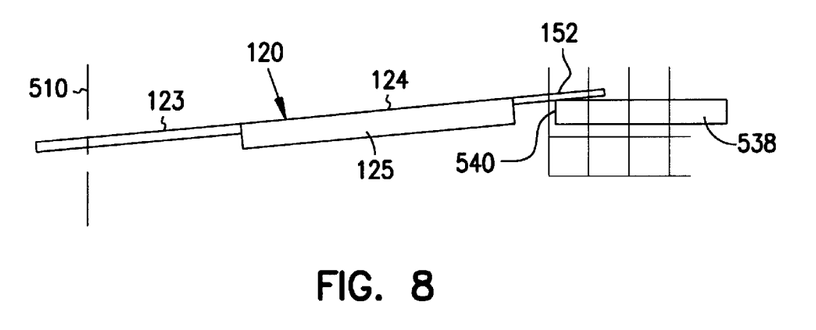
FIG. 8 a side view of the actuator arm and ramp along line 8—8 in FIG. 6 showing the actuator arm in a second position with respect to the ramp.

This change in the contact point can also be seen in FIGS. 7 and 8. FIG. 7 is a side view of the actuator arm assembly 120 and the ramp 538 along line 7—7 in FIG. 5. FIG. 7 shows a side view of the actuator arm assembly 120 in a first position with respect to the ramp 538. In this particular instance, the contact point between the lift tab 152 and the ramp 538 is near the end of the lift tab 152. As shown, the contact point of the lift tab 152 is near the end of the lift tab 152 on the contact edge or edge 540 of the ramp 538. As shown in FIG. 7, the actuator arm 123 is in a position where it is just starting up the ramp 538. Another way of putting this is that the actuator arm 123, suspension 125, and the lift tab 152 are in the initial phase of being moved from a loaded position on the disc (shown in FIG. 5).

FIG. 8 is a side view of the actuator assembly 120 and the ramp 538 along line 8—8 in FIG. 6. FIG. 8 shows the actuator arm 123, suspension 125, and lift tab 152 in its second position with respect to the ramp 538. As shown in FIG. 8, the contact point between the edge 540 and the lift tab 152 has moved along the lift tab 152 into a closer position with respect to the load beam or load spring 124, when compared to the position shown in FIG. 7. Sliding up the ramp 538 shortens the distance between the actuator pivot point 510 and the contact point on the lift tab 152. The distance between the actuator pivot point 510 and the contact point becomes progressively shorter as the actuator assembly 120 pivots to remove the slider 126 from the surface of the disc during the unloading process. This is better shown in FIG. 9.

Figure 9:
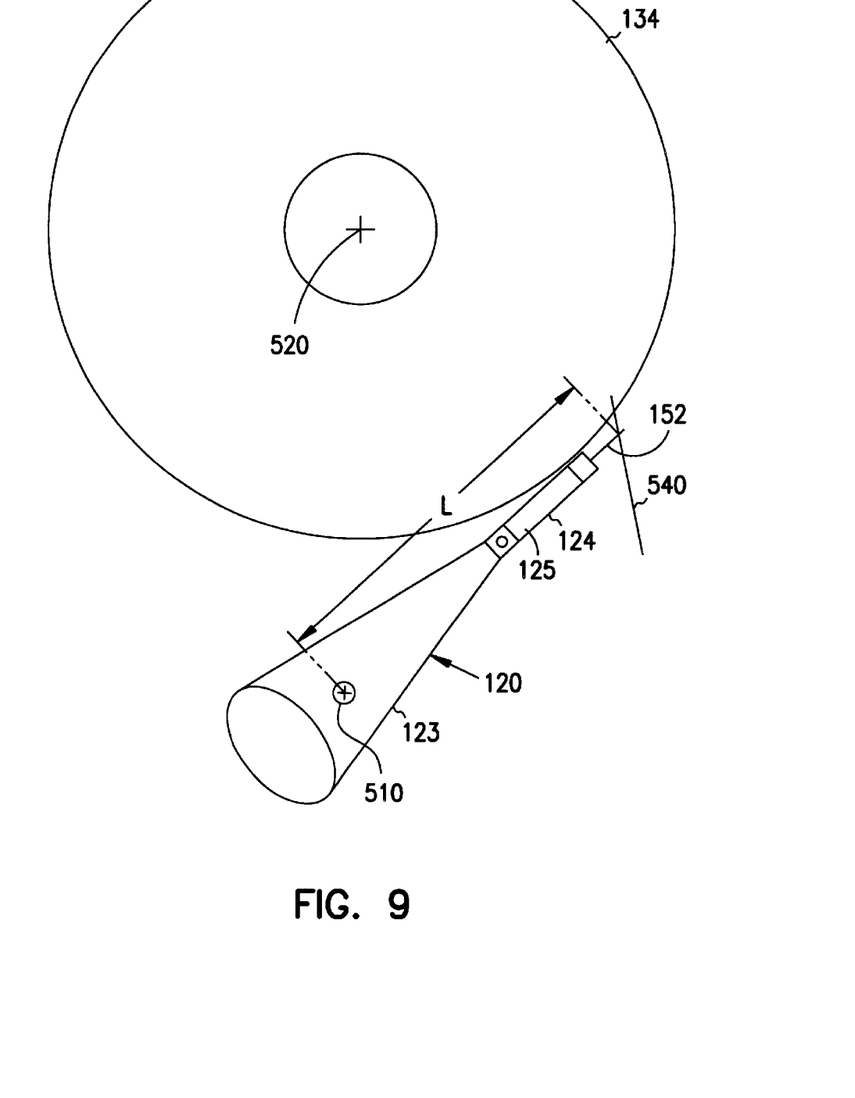
FIG. 9 is a top view of the actuator arm and ramp along showing the line of contact along the ramp and its relationship to the effective length of the actuator arm.

FIG. 9 is a top view of the actuator arm 123 of the actuator assembly 120 with an attached suspension 125. Attached to the suspension is the lift tab 152. The contact edge 540 is depicted as a line in FIG. 9. The distance between the point where the lift tab 152 contacts the edge of the ramp (depicted by reference number 540) and the actuator pivot point 510 is designated as L. As can be seen from FIG. 9, as the actuator arm assembly 120 moves the arm 123 further away from the axis of rotation 520 of the disc, the lift tab 152 moves up the ramp (shown in FIGS. 5–8). Also as the actuator arm assembly 120 moves the lift tab 152 up the ramp (shown in FIGS. 5–8), the contact point between the lift tab 152 and the contact edge 540 moves toward the actuator pivot point 510. This shortens the length L. Put another way, as the actuator arm assembly 120 rotates the arm 123, the suspension 125 and the lift tab 152 from a loaded position to an unloaded position, the length L designated in FIG. 9, decreases. This feature has certain advantages which will now be further explained.

The structure shown schematically in FIG. 9, namely the actuator arm assembly 120 including the suspension 125 and the lift tab 152 has a natural resonant frequency. The longer the length L, the lower the resonant frequency associated with the structure. The natural resonant frequency of the actuator assembly 120 when the lift tab 152 contacts the ramp (shown in FIGS. 5–8) near the disc may be selected to optimize any of the following conditions: 1) its natural frequency with regard to disc RVA components, 2) head bound back period, and 3) increased compliance to accommodate effects of tolerances. The lift tab 152 contact point changes as the heads move out of the flyable zone of the disc. The lift tab contact point is selected to increase the lift tab 152 stiffness to ensure that all of the heads are off of the discs when assembly tolerances are considered. Thus, when the negative pressure force or suction force between the slider 126 and the disc 134 is finally broken during the unloading process, a lower resonance structure aids in preventing the slider 126 (shown in FIGS. 1 and 2) from slapping the disc 134 since the natural resonant frequency provides a longer cycle time before the slider 126 rebounds back toward the disc 134. The cycle time associated with the natural resonant frequency when the actuator arm 123 is positioned for unloading the slider 126 (shown in FIGS. 1 and 2) and head from the disc surface is selected so that the length of time to remove the slider 126 (shown in FIGS. 1 and 2) from the disc 134 and place it up the ramp 538 is less than the cycle time associated with the natural resonant frequency for the particular length, L.

The lower natural resonant frequency increases the time before the slider 126 (shown in FIG. 1) bounces back or returns to a position where it can contact the disc 134. The lower frequency also allows for a slower unload time in addition to the slower initial rebound oscillation. The design still allows for a stiff lift tab 152 that provides for minimal unload footprint. In other words, using a stiff lift tab 152 provides for a faster breaking or lift-off of the slider 126 from the surface of the disc 134. Advantageously, the lift tab 152 compliance in the beginning of the unload cycle or toward the end of the load cycle allows the head or slider 126 to follow the RVA of the disc 134 while energy is being stored up during the elastic deformation of the lift tab 152. The increased lift tab compliance allows the slider to fly until enough energy has been stored up to pull the slider 126 (shown in FIGS. 1 and 2) from the disc 134 and prevent it from bouncing back to the disc 134. Thus, the risk of skipping the head 150 on the disc is significantly reduced.

A method for unloading a loading a slider from a disc includes the steps of providing a suspension with a lift tab, and controlling a natural frequency of the slider between a transducing position and an unloaded position by controlling the design of the ramp. The controlling step may also include controlling the velocity and acceleration of the slider with respect to the disc surface. The method further includes formulating a transfer function to describe the motion of the suspension and slider.

Figure 10:
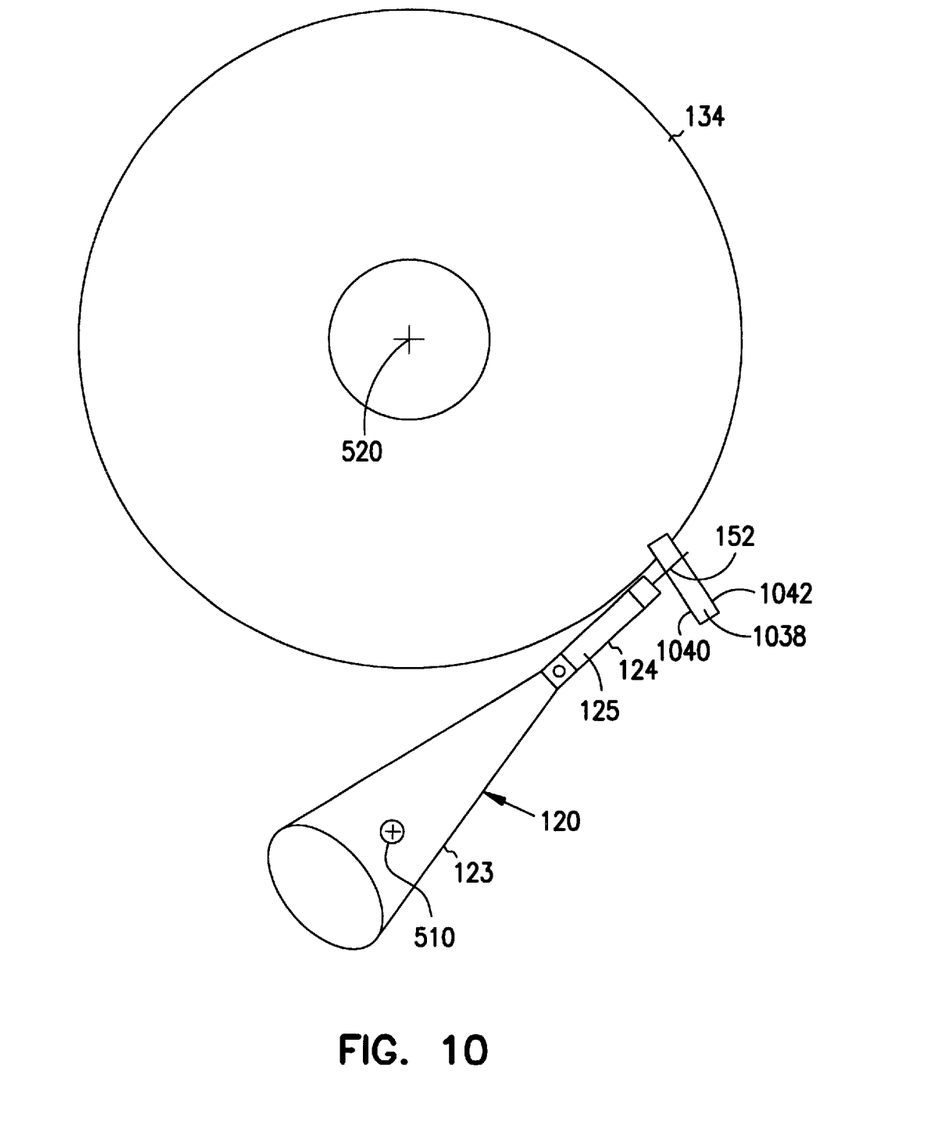
FIG. 10 is a top view of the actuator arm and another embodiment of a ramp.

The ramp 538 need not be trapezoidally shaped. FIG. 10 shows a top view of an actuator arm 123 in another embodiment having a ramp 1038. In this case, the ramp 1038 has two straight sides, one of which is a contact edge 1040 and the other side 1042 parallel to side 1040.

Figure 11:
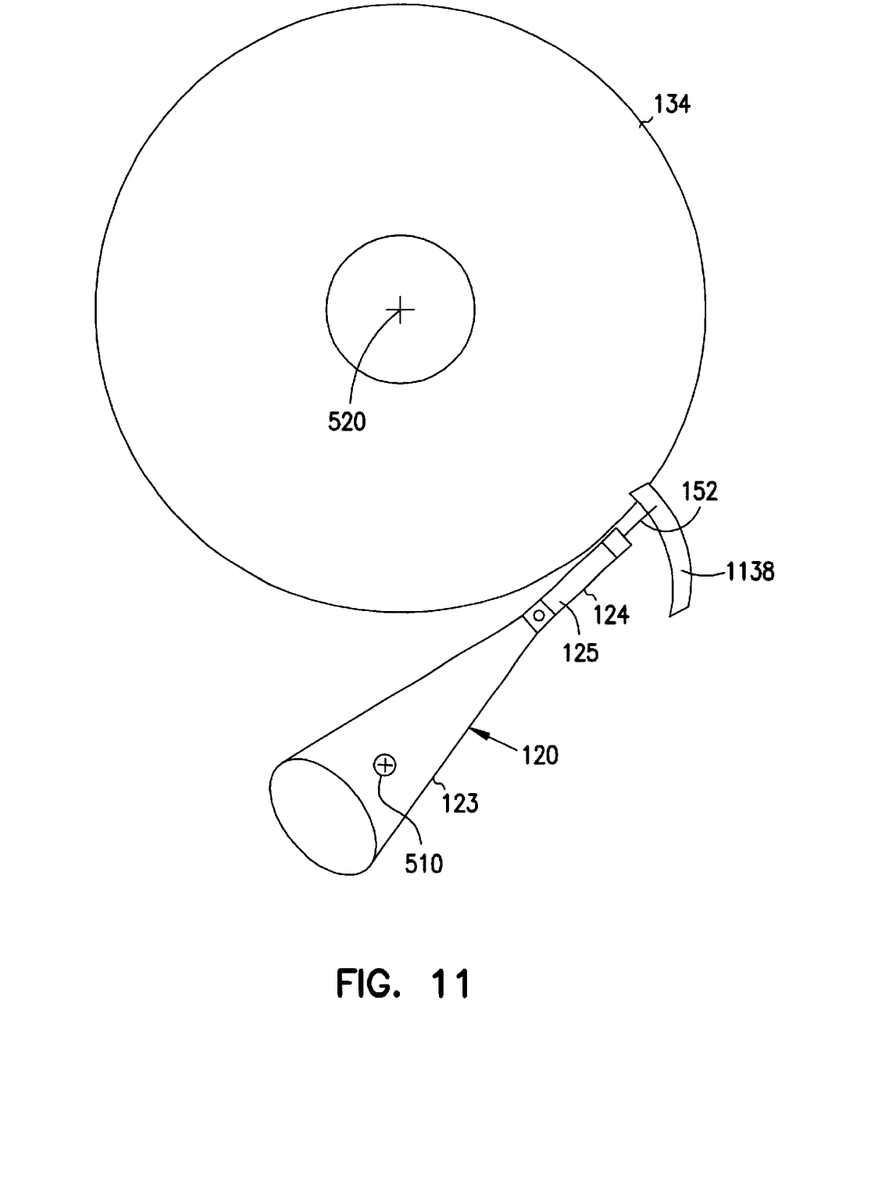
FIG. 11 is a top view of the actuator arm and another embodiment of a curved ramp.

FIG. 11 shows yet another embodiment having a curved ramp 1138. In this case, the contact surface 1140 is curved such that the length, L (discussed with respect to FIG. 9), between the contact point of the actuator arm 123, and the pivot point 510 of the actuator 120 shortens as the actuator assembly 120 is pivoted away from the disc pivot point 520. In this case, the advantageous effects of having a low resonance near the surface of the disc 134 and a higher resonance as the lift tab 152 moves up the ramp 1138, are maintained.

Advantageously, the invention allows for use of a stiff lift tab that has a lower resonant frequency at the bottom of the ramp so that the initial lift off of the slider can take place over a longer time. The resonant frequency increases as the lift tab moves further up the ramp which results in minimization of the footprint during unloading. The length between the contact point on the slider and the pivot point of the actuator shortens as the lift tab moves up the ramp. Initially, the time required to move the lift tab up a selected distance on the ramp is less than one cycle of the natural resonant frequency of the actuator assembly. This method for unloading the sliders from the disc prevents or minimizes the possibility of contact as well as the possibility of damage to the heads. The ramp features required for this design are easy to manufacture and the ramp does not require adjustment.

Conclusion

In conclusion, a magnetic disc drive 100 includes a base 112, a disc 134 rotatably attached to said base 112, and a ramp 238, 538, 1038, 1138 attached to the base 112 near said disc 134. The magnetic disc drive 100 also has an actuator assembly 120 pivotably attached to the base 112. The actuator assembly 120 rotates about an actuator pivot point 510. The actuator assembly 120 further includes a suspension 124 attached to one end of the actuator assembly 120, and a slider 126 attached to the suspension 124. The actuator assembly moves the slider 126 between a transducing position and an unload position. The suspension 124 includes a lift tab 152 which contacts the ramp 238, 538, 1038, 1138 at a contact point as the transducer is moved to the unload position. As the actuator assembly 120 moves the transducer 126 to the unload position, the contact point between the edge 540 of the ramp 238, 538, 1038, 1138 and lift tab 152 moves toward the actuator pivot point 510. The magnetic disc 134 has a disc pivot point 520. The ramp 238, 538, 1038, 1138 also has a contact edge 540 positioned so that the contact edge 540 of the ramp 538 moves closer to the actuator pivot point the farther the contact edge 540 is from the disc 134. The ramp 1138 may also include a curved contact edge 1140. The ramp may be trapezoidally shaped, rectangularly shaped, or curved. The ramp 238, 538, 1038, 1138 is orientated so that an edge 540 of the ramp is not tangent to the arc made by the initial point where the lift tab contacts the ramp. Furthermore, the arcuate edge of the ramp 1138 along which the lift tab 152 contacts the ramp should not have a center corresponding to the actuator pivot point 510.

The actuator assembly 120 has a natural resonant frequency. The natural resonant frequency increases as the actuator assembly 120 moves the slider 126 and transducer 150 to the unload position. The natural resonant frequency of the actuator assembly 120 may progressively increase as the actuator assembly 120 moves the transducer 150 from a transducing position to a fully unloaded position. The actuator assembly 120 has a lower natural resonant frequency when the lift tab 152 contacts the ramp 238, 538, 1038, 1138 near the disc 134 than the natural resonant frequency when the lift tab 152 contacts the ramp farther away from the disc 134 or as the actuator assembly 120 moves the lift tab 152 up the ramp 238, 538, 1038, 1138. The natural resonant frequency of the actuator assembly when the lift tab 152 contacts the ramp 238, 538, 1038, 1138 near the disc 134 may be selected so that the cycle time of the actuator assembly 120 near the disc 134 is longer than the time necessary for the lift tab 152 to progress up the ramp 238, 538, 1038, 1138 to a point where the slider 126 and transducer 150 attached to the actuator assembly 120 could no longer contact the disc 134. The length, L, of the portion of the actuator assembly 120 positioned between the actuator pivot point 510 and the contact point 540 decreases as the actuator assembly moves the transducer 150 toward the unload position or moves the lift tab 152 up the ramp 238, 538, 1038, 1138.

Also disclosed is an information handling system which includes a base 112, a disc 134 rotatably attached to the base 112, a ramp 238, 538, 1038, 1138 attached to the base 112 near the disc 134, and an actuator assembly 120 pivotably attached to the base 112. The actuator assembly 120 pivots about an actuator pivot point 510. The actuator 120 further includes a suspension 125 attached to one end of the actuator assembly 120, and a slider 126 attached to the suspension 125. The actuator 120 moves the slider 126 between a transducing position and an unload position. The suspension includes a lift tab 152 which contacts the ramp 238, 538, 1038, 1138 at a contact point as the slider is moved to an unload position. The ramp 238, 538, 1038, 1138 is orientated so that the distance between the contact point 540 and the actuator pivot point 510 shortens as the actuator assembly moves the transducer up the ramp 238, 538, 1038, 1138. The actuator assembly 120 has a resonant frequency which becomes higher as the distance between the contact point 540 and the actuator pivot point 510 shortens. The ramp further comprises a lift tab 152 contact edge 540 where the lift tab 152 contacts the ramp 238, 538, 1038, 1138. The lift tab 152 contact edge may be substantially straight and positioned on a non-radial chord 550 of the disc 134 or may be substantially curved. The ramp 238, 538, 1038, 1138 further comprises a lift tab 152 contact edge where the lift tab contacts the ramp 238, 538, 1038, 1138. The lift tab contact point moves toward the actuator pivot point 510 as the actuator assembly moves the transducer up the ramp toward the unload position or away from the disc pivot point 520.

Also disclosed is a disc drive 100 which includes a disc 134, an actuator assembly 120, a slider 126 attached to the actuator assembly 120, and a device for moving the transducer between a transducing position with respect to the disc and an unloaded position.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A magnetic disc drive comprising:
    a base;
    a disc rotatably attached to said base;
    a curved ramp attached to the base near said disc, the ramp comprising substantially curved contact edge defined by an intersection between two surfaces; and
    an actuator assembly pivotably attached to said base at an actuator assembly pivot point, the actuator assembly further comprising:
        a suspension attached to one end of the actuator assembly; and
        a slider attached to said suspension, the slider being movable between a transducing position and an unload position, the suspension including a lift tab configured to contact the edge of the ramp at a contact point such that the contact point moves towards the actuator pivot point as the slider moves towards the unload position, a distance between a tip of the lift tab and the contact point continually increasing, with the contact point also being nearest to the actuator pivot point when the slider is furthest away from the disc.

2. The magnetic disc drive of claim 1 wherein the ramp is trapezoidally shaped.

3. The magnetic disc drive of claim 1 wherein the natural frequency of the actuator assembly increases as the actuator assembly moves the slider towards the unload position.

4. The magnetic disc drive of claim 1 wherein the natural frequency of the actuator assembly progressively increases as the actuator assembly moves the slider from a transducing position towards a fully unloaded position.

5. The magnetic disc drive of claim 1 wherein the natural frequency of the actuator assembly is lower when the lift tab contacts the ramp near the disc than when the lift tab contacts the ramp farther away from the disc.

6. The magnetic disc drive of claim 1 wherein the natural frequency of the actuator assembly is lower when the lift tab contacts the ramp near the disc than when the lift tab is moved up the ramp.

7. The magnetic disc drive of claim 1 wherein the length of the portion of the actuator assembly positioned between the actuator pivot point and the contact point decreases as the actuator assembly moves the transducer toward the unload position.

8. The magnetic disc drive of claim 1 wherein the length of the portion of the actuator assembly positioned between the actuator pivot point and the contact point decreases as the actuator assembly moves the lift tab up the ramp.

9. The magnetic disc drive of claim 1 in which the base and one of the surfaces of the ramp lie in generally parallel planes.

10. The magnetic disc drive of claim 1 in which the two surfaces of the ramp are generally orthogonal to one another.

11. An information handling system comprising:
    a base;
    a disc rotatably attached to said base;
    a curved ramp attached to the base near said disc, the ramp further comprising a lift tab contact edge where a lift tab contacts the ramp, the lift tab contact edge being substantially curved; and
    an actuator assembly pivotably attached to the base at an actuator assembly pivot point, the actuator assembly further comprising:
        a suspension including a lift that is attached to one end of the actuator assembly; and
        a transducer affixed to a slider, the slider attached to said suspension, the actuator assembly moving the transducer between a transducing position and an unload position, wherein a natural frequency of the actuator assembly when the lift tab contacts the ramp at a contact point is optimized to prevent the slider from contacting the disc as the transducer is moved to an unload or load position, wherein the ramp is oriented so that the distance between the contact point and the actuator pivot point shortens as the actuator assembly moves the lift tab up the ramp thereby stiffening the actuator assembly, the contact point being nearest the actuator pivot point when the transducer is furthest away from the disc while the distance between a tip of the lift tab and the contact point continually increases as the lift tab travels up the ramp towards the unload position.

12. The information handling system of claim 11 wherein the natural frequency of the actuator assembly increases as the distance between the contact point and the actuator pivot point shortens.

13. The information handling system of claim 11 wherein the ramp further comprises a lift tab contact edge where the lift tab contacts the ramp, the contact point moving toward the actuator assembly pivot point as the actuator assembly moves the lift tab up the ramp toward the unload position.

14. The information handling system of claim 11 wherein the natural frequency when the lift tab contacts the ramp is optimized to provide increased compliance for the actuator assembly.

15. The information handling system of claim 11 wherein the natural frequency when the lift tab contacts the ramp is optimized to with regard to the natural frequencies associated with another disc drive component.

16. The information handling system of claim 11 wherein at least one contact point is the tip of the ramp.

17. The information handling system of claim 11 wherein the natural frequency of the actuator assembly is optimized with regard to the natural frequencies associated with another disc drive component.

18. The information handling system of claim 11 wherein the natural frequency of the actuator assembly is optimized to prevent the slider from bouncing back and contacting the disc.

19. The information handling system of claim 11 wherein the natural frequency of the actuator assembly is optimized to provide increased compliance for the actuator assembly.

* * * * *